(12) United States Patent
Suendermann et al.

(10) Patent No.: US 8,682,669 B2
(45) Date of Patent: *Mar. 25, 2014

(54) SYSTEM AND METHOD FOR BUILDING OPTIMAL STATE-DEPENDENT STATISTICAL UTTERANCE CLASSIFIERS IN SPOKEN DIALOG SYSTEMS

(75) Inventors: David Suendermann, New York, NY (US); Jackson Liscombe, Brooklyn, NY (US); Krishna Dayanidhi, Jersey City, NJ (US); Roberto Pieraccini, New York, NY (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 1178 days.

This patent is subject to a terminal disclaimer.

(21) Appl. No.: 12/545,718

(22) Filed: Aug. 21, 2009

(65) Prior Publication Data
US 2011/0046951 A1 Feb. 24, 2011

(51) Int. Cl.
| | | |
|---|---|---|
| G10L 15/00 | (2013.01) | |
| G01L 21/00 | (2006.01) | |
| H04M 1/64 | (2006.01) | |
| H04M 11/00 | (2006.01) | |
| H04M 1/00 | (2006.01) | |

(52) U.S. Cl.
USPC ........... 704/257; 704/236; 704/275; 704/243; 704/232; 704/252; 379/88.01; 379/88.18; 455/556.1

(58) Field of Classification Search
USPC ......... 704/236, 257, 4, 9, 275, 235, 243, 240, 704/252, 232, 231; 379/88.01, 88.18; 705/1.1; 455/556.1
See application file for complete search history.

(56) References Cited

U.S. PATENT DOCUMENTS

| | | | | |
|---|---|---|---|---|
| 7,389,225 | B1 * | 6/2008 | Jensen et al. | 704/9 |
| 2003/0091163 | A1 * | 5/2003 | Attwater et al. | 379/88.01 |
| 2003/0191627 | A1 * | 10/2003 | Au | 704/9 |
| 2004/0120472 | A1 * | 6/2004 | Popay et al. | 379/88.01 |

(Continued)

OTHER PUBLICATIONS

D. Suendermann, et al. 2009. From Rule-Based to Statistical Grammars: Continuous Improvement of Large- Scale Spoken Dialog Systems. In *Proc. of the ICASSP*, Taipei, Taiwan.

(Continued)

*Primary Examiner* — Paras D Shah
*Assistant Examiner* — Neeraj Sharma
(74) *Attorney, Agent, or Firm* — Frommer Lawrence & Haug LLP; William S. Frommer (57) ABSTRACT

A system and a method to generate statistical utterance classifiers optimized for the individual states of a spoken dialog system is disclosed. The system and method make use of large databases of transcribed and annotated utterances from calls collected in a dialog system in production and log data reporting the association between the state of the system at the moment when the utterances were recorded and the utterance. From the system state, being a vector of multiple system variables, subsets of these variables, certain variable ranges, quantized variable values, etc. can be extracted to produce a multitude of distinct utterance subsets matching every possible system state. For each of these subset and variable combinations, statistical classifiers can be trained, tuned, and tested, and the classifiers can be stored together with the performance results and the state subset and variable combination. Once the set of classifiers and stored results have been put into a production system, for a given system state, the classifiers resulting in optimum performance can be selected from the result list and used to perform utterance classification.

19 Claims, 6 Drawing Sheets

(56) References Cited

U.S. PATENT DOCUMENTS

| | | | |
|---|---|---|---|
| 2004/0204940 A1* | 10/2004 | Alshawi et al. | 704/240 |
| 2005/0065789 A1* | 3/2005 | Yacoub et al. | 704/231 |
| 2005/0182628 A1* | 8/2005 | Choi | 704/252 |
| 2006/0074670 A1* | 4/2006 | Weng et al. | 704/257 |
| 2007/0083365 A1* | 4/2007 | Shmunk | 704/232 |
| 2008/0052076 A1 | 2/2008 | Metz | |
| 2008/0071533 A1* | 3/2008 | Cave et al. | 704/235 |
| 2008/0154595 A1* | 6/2008 | Nelken | 704/240 |
| 2008/0177547 A1* | 7/2008 | Yaman et al. | 704/257 |
| 2008/0208583 A1* | 8/2008 | Jan et al. | 704/257 |
| 2009/0070113 A1* | 3/2009 | Gupta et al. | 704/257 |
| 2010/0023331 A1* | 1/2010 | Duta et al. | 704/257 |
| 2011/0010164 A1* | 1/2011 | Williams | 704/9 |
| 2011/0077048 A1* | 3/2011 | Busch | 455/556.1 |
| 2011/0295602 A1* | 12/2011 | Tur | 704/243 |
| 2011/0307252 A1* | 12/2011 | Ju et al. | 704/232 |

OTHER PUBLICATIONS

D. Suendermann, et al.. "C5," in *Proc. of the SLT*, Goa, India, 2008.
McCallam, et al., "MALLET: A Machine Learning for Language Toolkit." http://mallet.sc.umass.edu.2002.

* cited by examiner

SYSTEM AND METHOD FOR BUILDING OPTIMAL STATE-DEPENDENT STATISTICAL UTTERANCE CLASSIFIERS IN SPOKEN DIALOG SYSTEMS

BACKGROUND OF THE INVENTION

1. Field of the Invention

The present invention relates generally to a system and method for spoken dialog systems.

2. Background Discussion

Automatic spoken dialog systems are often very complex. They may consist of hundreds of dialog states involving extensive dialog structures, have system integration functionality that communicates with backend databases or devices, support multiple input and output modalities, and can sometimes handle calls over more than 20 minutes in duration. In order to keep a caller engaged in such environments, the use of human-like speech processing is critical, e.g., the incorporation of various degrees of spoken language understanding, mixed-initiative handling, and dynamic response generation. One type of spoken language understanding, called natural language understanding, was first introduced on a large scale to automated spoken dialog systems as call classifiers. Here, the caller was asked a general question at the top of the call, such as, "Briefly tell me what you're calling about today." The caller's utterance was transcribed using a speech recognizer, and the caller was routed to a human agent based on a classification of the utterance produced by a semantic classifier. The human agent then interacted with the caller by providing services including, e.g., technical problem solving, billing support, or order processing.

Typically, spoken dialog systems are built using semantic classifiers for most or all of the dialog contexts, both for natural language as well as for directed dialog inputs. A semantic classifier is a program that provides a mapping between utterances a speech recognizer produces and one or more predefined semantic classes which represent different categories of meaning. Semantic classifiers can be rule-based, i.e. manually generated as a set of rules that provide said mapping, or statistical, i.e. based on a statistical classification model whose parameters are trained from data, i.e. transcribed training utterances (transcriptions) and their respective semantic meanings (annotations). There can also be combinations of rule-based and statistical classifiers. Statistical semantic classifiers are today used almost exclusively for natural language input, while rule-based classifiers are typically used for directed dialog input.

Once a spoken dialog system goes into production with the set of classifiers designed for the application, the system's performance may suffer due to a variety of reasons, e.g.:

1. semantic classifiers were built with no collected data (rather, rules were created out of the designer's expectation of what people would say in this specific recognition context),
2. semantic classifiers were built to span several contexts while callers actually behave differently given the context,
3. semantic classifiers were built on small amounts of data,
4. semantic classifiers were built on old or unrepresentative data.

Spoken dialog systems are often designed to emulate a human agent's role in the complexity of the services offered as well as in the length of interaction. At the same time, as dialog systems improve, so too do the expectations of callers. Several characteristics of modern dialog system design encourage callers to behave as if they were interacting with a human agent. Such characteristics include open-ended questions during the conversation and global commands such as "help" and "repeat" at every point in the dialog. This design encourages callers to say things that are not explicitly prompted by the context prompts in the dialog system. Furthermore, directed dialog prompts in which callers are asked to choose an item from a list often unintentionally elicit out-of scope utterances from callers by offering choices that may be incomplete, too vague, or too specific.

Also, classifiers used in different parts of a spoken dialog system may perform excellently on average but exhibit worse behavior in some individual contexts.

SUMMARY

The present invention is directed to a system and method for providing state-dependent semantic classifiers in a spoken dialog system.

In one embodiment, disclosed is a spoken dialog system comprising a computer including a processor, and memory, and including a data store for data derived from collected utterances received via the audio input; a data store for logging data including data reporting the association between a state of the dialog system when the utterances were recorded and the utterances; and a classifier component including a state-dependent semantic classifier generated using state-vector variables for a state of the dialog system. The state-dependent semantic classifier is generated by a process including matching the utterances to each state vector variable; selecting subsets of the state vector variables; determining which of the subsets of the state vector variables have at least one variable combination that corresponds with a minimum training size of n or greater utterances; and generating the state-dependent classifier using the state subset and variable combination that correspond with the n or greater utterances. More than one subset of n or greater training utterances can exist for a given state subset and variable combination. The determining subsets can comprise clustering a number of the state vector variables into a discrete set.

The system comprises a data store for storing transcribed utterances; and a data store for storing annotated utterances, wherein the data derived from the collected utterances is derived from the transcribed and annotated utterances. The data derivation component can include a program for deriving testing data and training data; and a data store for storing testing data and training data derived from the data from the n or greater utterances. The system further comprises an elimination component for determining m classifiers using the subsets of state vector variables that correspond with the n or greater utterances. The elimination component can include a training component for training state dependent classifiers using the subsets of state vector variables that correspond with the n or greater utterances and a comparison component for comparing the trained classifiers against initial classifiers and selecting from the compared classifiers a best-performing classifier eliminating a worse-performing classifier to determine the m classifiers.

The process for generating the state-dependent classifier can comprise identifying the state vector variables that are irrelevant to the dialog system's performance at the state vector. The state vector variables can include variables selected from the group consisting essentially of variable ranges and quantized variables. The process for generating the state-dependent classifier can comprise selecting a classifier with a predefined number of classes; determining a state-dependent class using the subsets of state vector variables; and adding at least one state dependent class to the classifier.

In another embodiment is disclosed a method for generating a classifier comprising: accessing a database of data derived from collected utterances for a dialog system; accessing logging data including data reporting the association between a state of the dialog system when the utterances were recorded and the utterances; identifying a plurality of state vector variables for the state of the dialog system; and generating a state-dependent classifier using the state vector variables. The method also comprises transcribing the utterances in a dialog system; annotating the utterances with a semantic category; storing data from the transcribed and annotated utterances in the database as the data derived from the collected utterances; and storing the logged data in the database.

The method further comprises matching the utterances to each state vector variable; selecting subsets of the state vector variables; determining which of the subsets of the state vector variables have at least one variable combination that corresponds with minimum training size of n or greater utterances; and generating the state-dependent classifier using the subsets of state vector variables that correspond with the n or greater utterances. The state vector variables include variables can be selected from the group consisting essentially of variable ranges and quantized variables. The selecting subsets can comprises clustering a number of the state vector variables into a discrete set. More than one subset of n or greater training utterances can exist for a given state subset and variable combination.

The method can include deriving testing data and training data from the n or greater utterances. Also included in the method is determining m classifiers using the subsets of state vector variables that correspond with the n or greater utterances. The method can comprise training state-dependent classifiers using the subsets of state vector variables that correspond with the n or greater utterances; and comparing the trained classifiers against initial classifiers and selecting from the compared classifiers a best-performing classifier eliminating a worse-performing classifier to determine the m classifiers. The method can also comprise identifying the state vector variables that are irrelevant to the dialog system's performance at the state vector.

The process for generating the state-dependent classifier can further comprise selecting a classifier with a predefined number of classes; determining a state-dependent class using the subsets of state vector variables; and adding the state dependent class to the classifier.

Also disclosed is a method for generating a classifier comprising: transcribing a plurality of utterances in a dialog system; annotating the utterances with a semantic category; storing data from the transcribed and annotated utterances in a database; logging data including data reporting the association between a state of the dialog system when the utterances were recorded and the utterances; and storing the logged data in a database. The method includes identifying a plurality of state vector variables for a state of the dialog system; matching the utterances to each state vector variable; selecting subsets of the state vector variables; determining the subsets of the state vector variables having at least one variable combination that corresponds with minimum training size of n or greater utterances; and generating a state-dependent classifier using the subsets of state vector variables that correspond with the n or greater utterances.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used herein, the indefinite article "a" or "an" and the phrase "at least one" shall be considered, where applicable, to include within its meaning the singular and the plural, that is, "one or more."

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Large scale exploitation of transcription and annotation of all the utterances collected by a speech recognizer in millions of calls enables rigorous replacement of manually written utterance classifiers, common in commercial spoken dialog systems, by statistical classifiers which are conventionally used only in open-prompt contexts, as described in U.S. patent application Ser. No. 12/425,892, the entirety of which is incorporated by reference herein. Moreover, even a small number of utterances, 1000 or less, can be enough to train statistical classifiers which consistently outperform their rule-based counterparts. However, after an initial relatively steep ramp up, the relative performance gain can flatten when higher numbers of utterances are being used. In addition, many classifiers used in different parts of a dialog system application may perform well on average, but can exhibit worse behavior in individual contexts.

For example, a yes/no-only classifier—one that only maps for an affirmative or negative response in any recognition context—for an application can be trained on hundreds of thousands of utterances collected over hundreds of recognition contexts of multiple dialog systems. In the application at hand the overall number of affirmative answers is higher than that of negative responses when computed across all contexts. Thus a statistical context-independent classifier assigns a high a priori probability to "yes" and a low probability to "no" and their synonyms. However, the classifier would perform poorly when applied to a specific context where the number of negative responses is significantly higher than the positive ones.

With this example in mind, it is important to point out that this phenomenon is not limited to the influence of the recognition context but also to that of a multitude of system variables that may affect the distribution of user inputs, such as:
  the caller population;
  the individual caller (his account state, personal profile, etc.);
  external events (e.g. outages, sales campaigns);
  time of the day (e.g., at night, no human agents may be available, and the caller is forced to use self service as opposed to day time where self service may be voluntary); and
  call history (information collected on the same or prior calls).

Generally, utilizing the notion of state-based dialog management, as described in Speech and Human-Machine Dialog. Springer, W. Minker and S. Bennacef, N.Y., USA, 2004, user input distributions are determined to be state-dependent causing classification performance to vary accordingly.

While a reasonable way to overcome the state dependency problem would be that of training specific state-dependent classifiers, there is still a trade-off to be balanced between using more data for a single classifier versus using less data for each individual one. For instance, by using all data available in all states for a single general classifier, one may obtain better performance than smaller amounts of the same data for each individual state. In order to balance state-dependent performance versus the use of more data for state-independent classifiers, disclosed is a data-driven methodology aimed at producing an optimal solution for any given set of data.

A system and a method to generate statistical utterance classifiers optimized for the individual states of a spoken dialog system are disclosed. The system and method make use of large databases of transcribed and annotated utterances from calls collected in a dialog system in production and log data reporting the association between the state of the system at the moment when the utterances were recorded and the utterance. From the system state, being a vector of multiple system variables, subsets of these variables, certain variable ranges, quantized variable values, etc. can be extracted to produce a multitude of distinct utterance subsets matching every possible system state. For each of these subsets and combinations of actual values these variables can assume (variable combinations), statistical classifiers can be trained, tuned, and tested, and the classifiers can be stored together with the performance results and the state subset and variable combination. Once the set of classifiers and stored results have been put into a production system, for a given system state, the classifiers resulting in optimum performance can be selected from the result list and used to perform utterance classification.

Without loss of generality, a dialog state is represented by a vector of state variables. Depending on the number of variables and their values, the number of possible states is extremely large, or infinite. Thus the number of utterances available for each state can be very small or zero. Accordingly, a subset of the state vector variables is selected, each one of them associated to certain amounts of the available data. In addition, the selected variables themselves can be clustered or quantized to reduce the complexity of the state space. For example, one may cluster the call time into the discrete set of {morning, afternoon, evening, night}. Furthermore, certain variables have very little impact on the input utterance distribution (as for example the time of the day in a context where callers are asked for their phone numbers), so their distinction may be irrelevant with respect to performance improvement. By trying all possible (or reasonable) combinations of variables derived at every state, training statistical classifiers for these combinations, testing them against a test set specific to the variable combination, and selecting the combination that maximizes classification performance, it is possible to produce optimal classifiers for every possible state of a dialog system, provided a set of transcribed and annotated data is available.

As outlined herein, utterance collection, transcription, annotation, language modeling, classifier training, and classifier releasing can be carried out partially or wholly automatically, in a continuously running cycle. The term "grammar" or "speech recognition grammar" as used herein, refers to a rule or script for a speech recognition engine that is used to recognize an utterance; and in particular, attempts to describe all possible sequences of words (i.e., word strings) processed by a speech recognizer. As used herein, the term "classifier" or "semantic classifier" refers to, inter alia, a method to classify and map recognized utterances to an associated class. As explained above, a semantic classifier is a method that provides a mapping between utterances a speech recognizer is able to recognize and one or more predefined classes which represent different categories of meaning. Semantic classifiers can be rule-based, i.e. manually generated as a set of rules that provide said mapping, or statistical, i.e. based on a statistical classification model whose parameters are trained from data, i.e., transcribed training utterances (transcriptions) and their respective semantic meanings (annotations). There can also be combinations of rule-based and statistical classifiers. The embodiments described herein are statistical classifiers. A classifier can take, among other things, a recognized sequence of words output from a speech recognizer—a hypothesis—and assign a meaning thereto, as learned by transcription and annotation of utterances.

In one embodiment, there is disclosed a system and method based on the collection of speech utterances recorded in the recognition contexts of a given spoken dialog system and their transcription and annotation.

Utterance collection can be for all states of the spoken dialog system or for a subset of states in conjunction with certain variable combinations. It can include a fixed number of utterances per state subset and variable combination or all utterances processed by the spoken dialog system for this state subset and variable combination in a certain time frame. The set of the utterances' transcriptions and annotations can be further split into test and training data sets.

A baseline performance for a given state subset and variable combination can be determined based on the comparison between annotations and classification results of the classifier using the test portion of the data. These results can come from the spoken dialog system run in production or from an offline experiment using identical (or similar) classifiers in conjunction with an identical (or similar) speech recognizer.

The training portion of the data can be used to tune parameters of the existing classifier or build a new classifier. Parameters can include semantic confidence threshold, rule weights, class prior probabilities, and many others, depending on the classifier used.

The classifier's performance is determined on the test set and reported in a performance table together with the state subset and variable combination.

If a state subset and variable combination of a classifier A is a subset or identical to the state subset and variable combination of a different classifier B and B outperforms A to a certain degree, B can be eliminated from the set of classifiers used in the dialog system. The degree of minimum performance gain can be defined as (not limited to) relative gain, absolute gain, statistically significant gain.

Collection, transcription, annotation, training, and testing can be done in the scope of a repeated procedure, thereby keeping the classifiers up-to-date. While static repetitive tuning goes into saturation after collection of a certain number of utterances, tuning of state-dependent classifiers will result in a performance gain for significantly longer. This is because the availability of more training data may lead to the emergence of new or better performing state subset and variable combinations thereby shifting optimal classifiers from more general to more specific ones. For instance, a single classifier that was used at multiple places throughout a spoken dialog system can be replaced by several individual classifiers that cover more specific domains.

Figure 1:
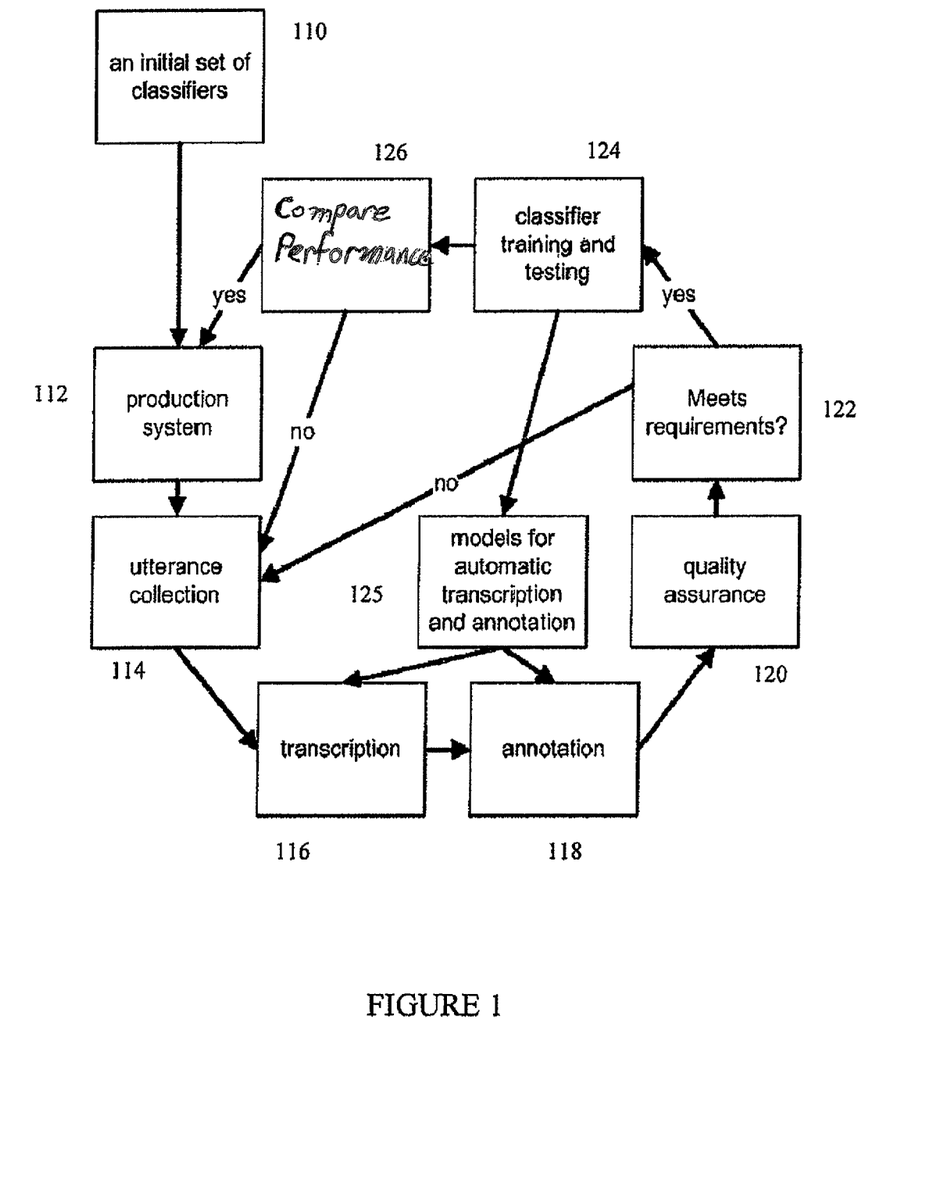
FIG. 1 illustrates a flow chart of a high-level view of a classifier improvement cycle according to an embodiment of the present invention.

FIG. 1 shows a high-level flow chart of the continuous improvement cycle for optimizing semantic classification in a spoken dialog system in one embodiment of the invention.

An initial set of classifiers 110 is used in a production spoken dialog system 112. A plurality of utterances is collected 114 and processed using the semantic classifiers 110. Instances of utterance recognition events at these classifiers 110 are stored together with logging data including the name and version of the classifier(s) active, the semantic class resulting in the highest classification score of the current utterance, the context in which the utterance was recognized, the speech recognizer's hypothesis of the respective utterance, acoustic and semantic confidence scores of the respective utterance, the speech data itself, the spoken dialog system's version and additional information about the system, the caller, and the utterance. Alternatively, instead of the semantic class, the speech recognizer hypothesis, and acoustic and semantic confidence scores, the n·m best semantic classes of the n best speech recognizer hypotheses and their respective n acoustic confidence scores and n·m semantic confidence scores are stored. This logging data (or parts thereof) can be used for the generation of state-dependent classifiers.

The utterances are transcribed 116. This can be done manually or partially in an automated fashion. An exemplary transcription component can be, for instance, a program that plays back an utterance and gives the speech recognizer's hypothesis as a suggestion that the transcriber can modify if necessary. Next, the utterances are annotated 118 with their respective semantic meanings. This can also be done manually or partially in an automated fashion. Automatic transcription and annotation can also be based on models trained on data formerly processed by a continuous optimization cycle 125, as described in U.S. patent application Ser. No. 12/425,892, the entirety of which is incorporated by reference herein.

In order to achieve reliability and consistency among annotations, a quality assurance procedure 120 can be carried out, as described in U.S. patent application Ser. No. 12/425,892, the entirety of which is incorporated by reference herein. Furthermore, criteria thresholds can flag whether it is appropriate to begin training a new classifier or classifier parameters for a given state subset and variable combination.

A quality assurance step can be applied which can include one or multiple quality assurance criteria, including:

1. Completeness check of annotations. Only utterances from a date range including a complete set of annotations are considered. This is to make sure that the classes and utterances match the real distribution.
2. Consistency check of annotations. Similar utterances, according to some defined similarity criterion, are required to be assigned to the same semantic class.
3. Congruence check of annotations. The class provided by an initial rule-based classifier for the transcribed utterance must produce the same result as the annotation. Of course, this check is only available when the utterance is in scope of the rule-based classifier.
4. Correlation check of annotations. Discrepancies amongst annotations assigned to the same utterances by different annotators are identified.
5. Confusion check of annotations. Completely annotated and consistency-checked data is checked against a distinct set of randomly selected and likewise annotated test utterances, classes of highest confusion are identified and examined.
6. Coverage check of annotations: Coverage refers to the scope of utterances that a classifier will classify into one of the classes expected as semantic input by the spoken dialog system in a given recognition context. To assure that the classifier is able to evaluate the input utterance in most of the cases, the coverage should be as high as possible. If an utterance is considered out-of-scope in the current context it can be assigned a garbage class. Examples include noise events, background speech, and cursing. However, reasonable utterances that are not yet covered by the spoken dialog system logic also can go into the garbage class. If the number of utterances ending up in the garbage class is too high, the issue can be addressed by changing the spoken dialog system logic or system prompts associated with the context to accommodate caller behavior and/or by adding new classes to the classifier.
7. Corpus size check: Test and/or training corpus size of annotated utterances for training a classifier must have a minimum size to produce reliable performance metrics and/or assure a certain coverage of utterances or classes. In order to benchmark classifier performance, a test set of a minimum size must be available.

If quality assurance is met 122, a classifier can be trained using the data from annotated utterances 124. Whenever the data from the annotated utterances fulfills the above quality assurance requirements for a recognition context, the available data can be split into training and testing data. The training data can be used to generate a classifier.

Optionally, the training data can be further partitioned into development and training data. The former can be used for optimizing the parameters used for generating the final classifier. Alternatively, the training step can only involve tuning of the classifier parameters.

Once a classifier is trained, its performance is measured 126 against the test set by comparing test utterance annotations with classification results obtained by applying the classifier to speech recognition hypotheses created by a speech recognizer on the same stored speech utterances. The performance is reported in a table or other data representation format together with the used state subset and the variable combination.

Whenever a new classifier A with a performance, PA, is produced, it can be compared to the performance PB of all those classifiers B in the table whose state subset and variable combination is a subset (a) or superset (b) of the state subset and variable combination of A:

(a) if $P_A$ is significantly better than $P_B$ the classifier B can be eliminated.

(b) if $P_A$ is not significantly better than $P_B$ the classifier A can be eliminated.

The case that the state subset and variable combination of A and B are identical is a special case of both (a) and (b).

Here, a statistical measure p of the difference between $P_A$ and $P_B$ is applied to verify that the performance difference is reliable.

The system and method can be adapted to be carried out in a repeated optimization cycle providing more and more data and producing better and better classifiers or classifier parameters.

In one example for generating state-dependent classifiers, 1,033,457 utterances recorded in a certain type of system state (wait state) were retrieved from a number of dialog systems. The following variables were considered for a state variable vector of the dialog manager:

utterance id (i.e., roughly how many activities preceded the current state) [273 distinct values];
dialog module [724 distinct values];
customer [7 distinct values];
product [7 distinct values];
location (call center) [41 distinct values];
day of the week [7 distinct values]; and
hour of the day [24 distinct values].

The sheer number of different possible states is naturally pretty large (66,709,921,824), making it unrealistic to train state-dependent classifiers for all of them. However, a minimum number of utterances collected per state can be enough to train a reliable classifier. Here, the aforementioned splitting into subsets of state variables comes into play. Asking the question: "For all possible subsets of these variables, how many different variable combinations do we actually see in the data resulting in a minimum training size of n utterances?" all possible subsets of variables are tried, e.g.:

(A) utterance id, dialog module,
(B) customer, dialog module, product . . .

and so on, resulting on 128 subsets altogether. For each subset, it is determined how many different variable combinations exist.

Figure 2:
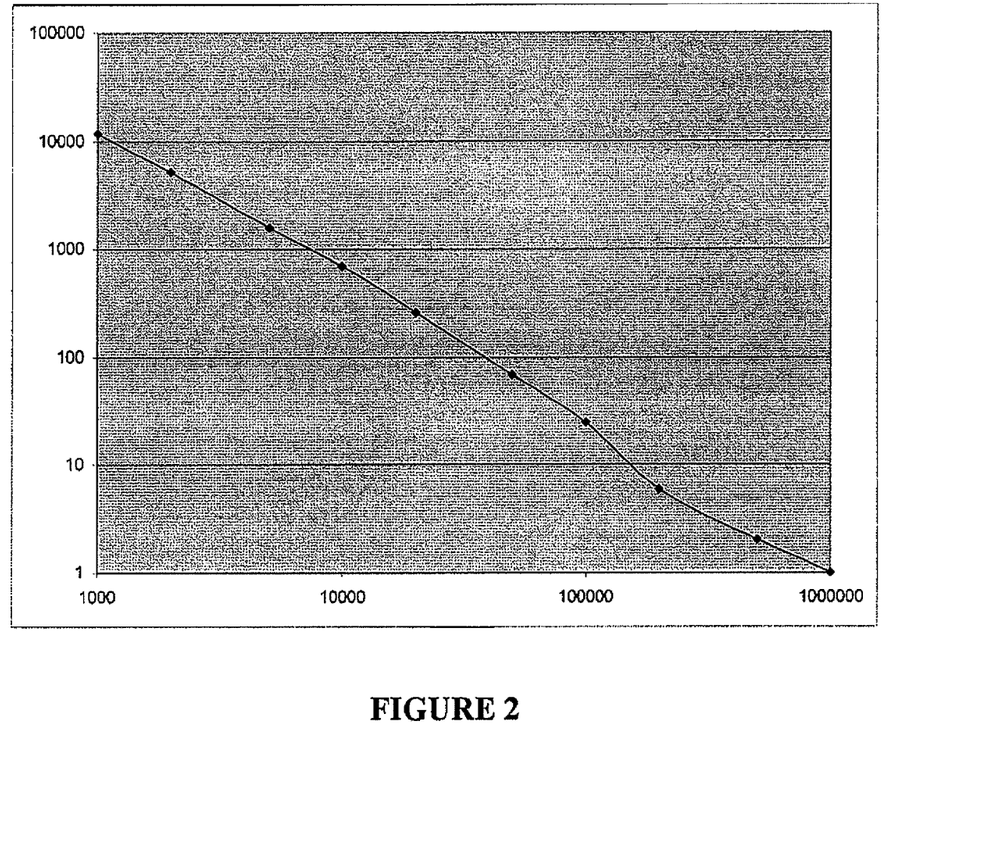
FIG. 2 is a graph illustrating the dependence between minimum training size and number of distinct classifiers.

For example, for (A)

utt_2, dm_1
utt_10, dm_1
utt_3, dm_2 or (B)

customer_1, dm_1, product_1
customer_2, dm_1, product_2 for which the number of individual utterances available is larger than the minimum n. This drastically reduces the number of possible combinations. For instance, assuming n=1000, there were only 11,746 state subset and variable combinations found for this particular example. FIG. 2 and Table 1 show how this number goes strongly down, the more training data is used. FIG. 2 and Table 1 show dependence between minimum training size and number of distinct classifiers. Interestingly, the relation between the both follows a clearly linear curve in double-logarithmic representation. This data demonstrates that there are only a couple of thousand different classifiers to train rather than trillions.

TABLE 1

Dependence between minimum training size and number of distinct classifiers

| Min train size (n) | # classifiers (m) |
|---|---|
| 1000 | 11746 |
| 2000 | 5153 |
| 5000 | 1564 |
| 10000 | 699 |
| 20000 | 261 |
| 50000 | 68 |
| 100000 | 25 |
| 200000 | 6 |
| 500000 | 2 |
| 1000000 | 1 |

Next is described an algorithm for selecting an optimal classifier in production based on results derived in training. Given a certain minimum training size n, m classifiers are to be trained. The n or more utterances are derived into training, development, and test data such that there is a reliable performance estimate of the respective state subset and variable combination. For a given variable combination, there may be more than one state subset exceeding n training utterances. Referring to Table 1, the simplest example is when n=500000 is chosen, leading to the following two subsets:

(A) none (this is the whole set of utterances)
(B) product (the only product comprising more than 500000 utterances is High Speed Internet [HSI]).

As (A) distinguishes no variables, it is a superset of (B), as (A) comprises all products.

After training and testing is finished, there is a set of m classifiers, along with a table containing the used state subset and variable combination and the associated performance achieved on the respective test set.

In production, i.e., when a dialog system using state-dependent classifiers takes live calls, at every state, the rows in the table whose variables match the current state variables are selected. Out of all competitors, the one that achieved highest performance in testing is selected. For the above simple example where we had only two state subset and variable combinations, the table looks like Table 2:

TABLE 2

Blank fields match everything

| utterance id | dialog module | customer | product | location | day of the week | hour of the day | performance |
|---|---|---|---|---|---|---|---|
| | | | | | | | 90% |
| | | | HSI | | | | 95% |

In production, when a wait state is processed where the product is not HSI, e.g. Video, only the first table row matches, and the respective classifier is used. However, when the product is HSI, both the first and second row match, and the classifier with the highest performance is selected, in the example the second row.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Figure 3:
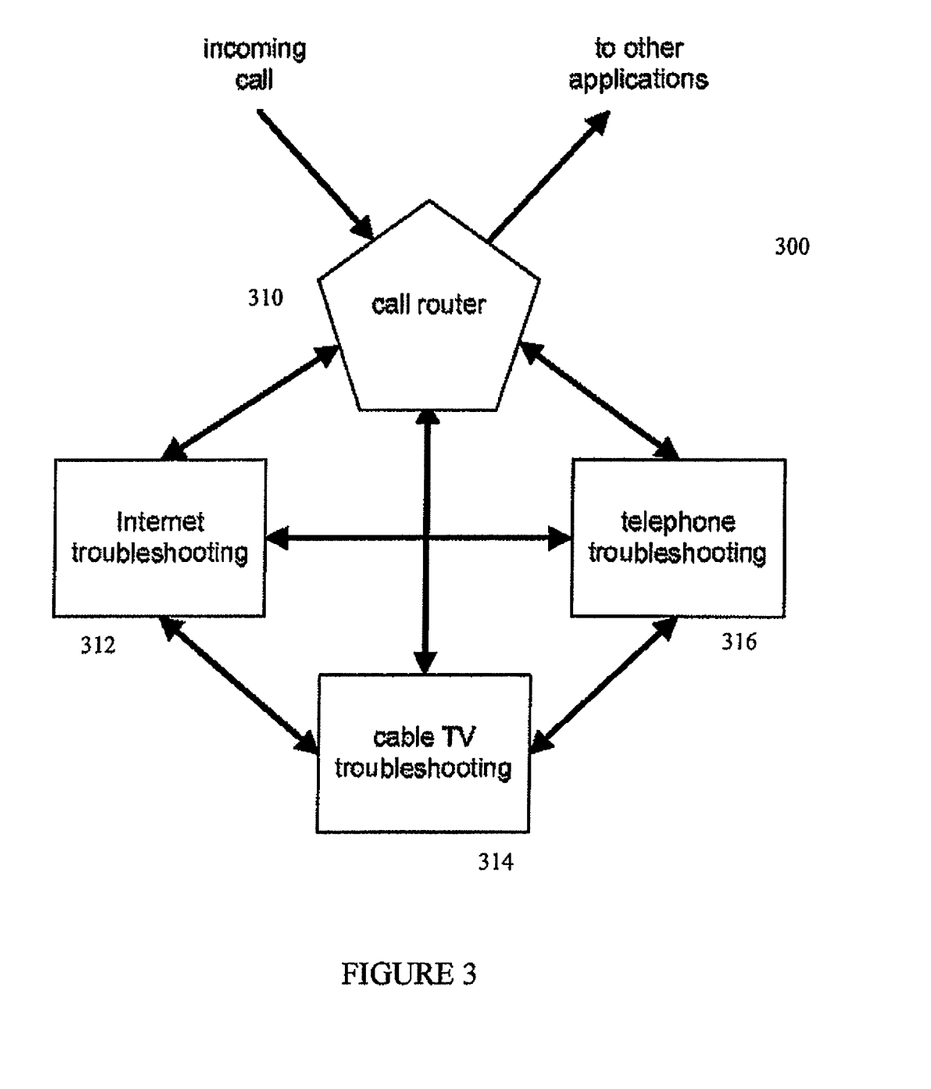
FIG. 3 illustrates an example of a dialog application comprising four individual dialog systems interacting with each other.

FIG. 3 shows an exemplary embodiment of a dialog application 300 comprising four individual dialog systems interacting with each other. In the exemplary embodiment, they are implemented in a "customer care" telephone portal of a large service provider (e.g. a cable service provider).

When customers call the hotline of the service provider, they are connected to a top-level call router 310 whose task is to determine the call reason and route the callers to the appropriate destination. This is done by accessing the callers' account information (using their telephone number as an identifier) and then asking either a general opening question such as "Briefly tell me what you're calling about today," or a caller-specific question such as "It looks like you called recently about your account. Are you calling about that now?" Depending on the caller response to the opening question and, potentially, to one or two follow-up questions, the most appropriate routing point is determined, and the call is transferred. If the call is about a technical problem with one ore more of the provider's services (e.g., broadband Internet (HSI) 312, cable TV 314, or telephone 316), the call is connected to one of the three respective troubleshooting dialog systems 312, 314, 316. If customers face problems with more than one service, they can be interconnected to one of the other troubleshooting dialog systems 312, 314, 316 or back to the call router 310.

Although there are multiple dialog systems, in production it is possible for the same classifier to be used at different parts of the various systems. For example, a classifier may be a "wait" state. This same "wait" classifier may be implemented in the Internet troubleshooting 312 dialog system for "Unplug Modem Then Continue," or in the cable TV troubleshooting 312 for "Reboot Box then Continue." Due to the ability to train, test, and develop state-dependent classifiers, the classifiers can thus be optimized. For example, a "wait" state can have three classes: (1) "continue," (2) "help," and (3) "operator." By targeting and developing the classifiers that have enough data, state-dependent classes can be added to the "wait" state to enhance performance. For example, a "wait" state for an Internet troubleshooting dialog system "Unplug Modem Then Continue," can include a fourth class for "Light is off" and synonyms thereof, assuming the subset/variable is identified and trained as outlined above. In such a system, a caller is prompted to unplug a modem, return, and say "continue"—whereupon the system is in the "wait" state. If, after the modem is unplugged the caller returns and says "the light is off" as opposed to "continue," the state-dependent classifier can now accept that utterance as in scope, and proceed to the state corresponding to the step after confirming the light is off.

Figure 4:
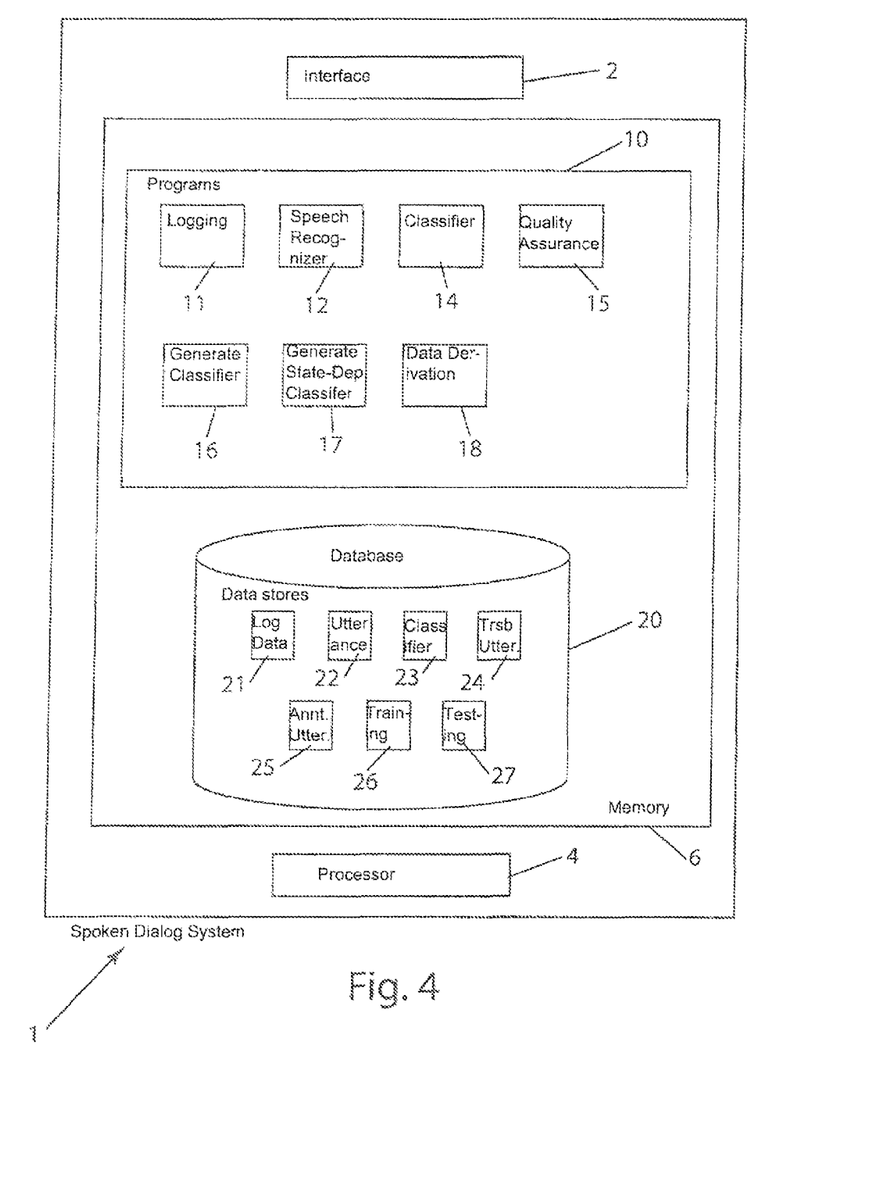
FIG. 4 shows a system overview for a system according to an embodiment of the invention.

FIG. 4 shows one embodiment of a system overview for optimizing the performance of semantic classifiers and implementing state-dependent classifiers in spoken dialog systems. As disclosed therein a spoken dialog system 1, comprises a computer including a signal input/output, such as via a network interface 2, for receiving input such as an audio input, a processor 4, and memory 6, including program memory 10. The system 1 may be implemented on a general-purpose computer under the control of a software program. Alternatively, the system 1 can be implemented on a network of general-purpose computers and including separate system components, each under the control of a separate software program, or on a system of interconnected parallel processors. Although complex, it is believed that suitable software for performing the various functions described herein can be designed and constructed by computer programmers of ordinary skill.

Figure 5:
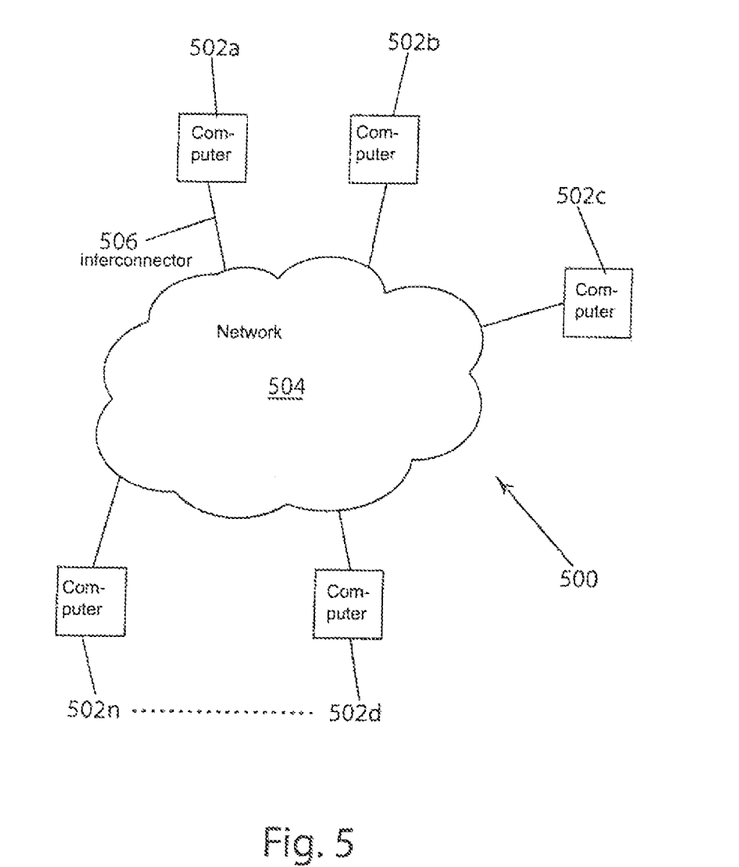
FIG. 5 shows an exemplary network environment adapted to support the present invention.

FIG. 5 shows a network environment 500 adapted to support the present invention. The exemplary environment 500 includes a network 504, and a plurality of computers, or computer systems 502(a) ... (n) (where "n" is any suitable number). Computers could include, for example one or more SQL servers. Computers 502 can also include wired and wireless systems. Data storage, processing, data transfer, and program operation can occur by the inter-operation of the components of network environment 500. For example, a component including a program in server 502(a) can be adapted and arranged to respond to data stored in server 502(b) and data input from server 502(c). This response may occur as a result of preprogrammed instructions and can occur without intervention of an operator.

The network 504 is, for example, any combination of linked computers, or processing devices, adapted to access, transfer and/or process data. The network 504 may be private Internet Protocol (IP) networks, as well as public IP networks, such as the Internet that can utilize World Wide Web (www) browsing functionality, or a combination of private networks and public networks.

A computer 502(a) for the system can be adapted to access data, transmit data to, and receive data from, other computers 502(b) ... (n), via the network or network 504. The computers 502 typically utilize a network service provider, such as an Internet Service Provider (ISP) or Application Service Provider (ASP) (ISP and ASP are not shown) to access resources of the network 504.

The computers 502 may be operatively connected to a network, via bi-directional communication channel, or interconnector, 506, which may be for example a serial bus such as IEEE 1394, or other wire or wireless transmission media. Examples of wireless transmission media include transmission between a modem (not shown), such as a cellular modem, utilizing a wireless communication protocol, or wireless service provider or a device utilizing a wireless application protocol and a wireless transceiver (not shown). The interconnector 504 may be used to feed, or provide data.

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

For example, a computer hosting a speech recognition engine may communicate to a computer hosting a classifier program via local area networks, wide area networks, direct electronic or optical cable connections, dial-up telephone connections, or a shared network connection including the Internet using wire and wireless based systems.

Returning to FIG. 4, the system 1 includes a speech recognition engine (i.e. a speech recognizer) 12. The system also includes data storage memory 20 including a number of data stores 21, 22, 23, 24, 25, 26, 27 which can be hosted in the same computer or hosted in a distributed network architecture. Grammars are held in a grammar data store (not shown). The system 1 includes a data store for a plurality of utterances 22 received via the audio input. The system 1 further includes a classifier component including a classifier data store 23 comprising a set of semantic classifiers (i.e., an initial set of classifiers), as well as a semantic classifier program 14 for, when executed by the processor, mapping the set of utterances processed by the speech recognizer 12 to the set of semantic classifiers.

The system includes a data store for storing transcribed utterances 24 and a data store for storing annotated utterances 25. Such data can be stored, for example, on one or more SQL servers (e.g., a server for the annotation data and a server for the transcription data). The system also discloses a component which includes a program for deriving data 18. The program 18 derives data from the annotated utterances 25. For instance, the program 18 can be adapted to query the annotated utterances 25 so as to separate data from the annotated utterances 25 into training data 26 and testing data 27. As discussed herein, training data 26 and testing data 27 derived from the annotated utterances will not overlap, although in some instances this may be the case (e.g., there is too little data in the annotated utterances to exclusively separate into training and testing corpora).

A quality assurance component includes a program 15 for, when executed by the processor, applying quality assurance criteria to the annotated utterances is also included in the system 1. The system 1 also includes a component including a program 16 for, when executed by the processor, generating a semantic classifier using data from the annotated utterances.

The system can also include a logging component including logging program 11 for, when executed by a processor, logging and storing data associated with the collected set of utterances. A logging data store 21 can store instances of speech recognition events identified by the speech recognition device at the semantic classifiers together with logging data for the semantic classifiers. Instances of utterance recognition events at these classifiers can be stored together with logging data including the name and version of the classifier(s) active, the semantic class resulting in the highest classification score of the current utterance, the state in which the utterance was recognized, the speech recognizer's hypothesis of the respective utterance, acoustic and semantic confidence scores of the respective utterance, the speech data itself, the spoken dialog system's version and additional information about the system, the caller, and the utterance. The logging data store 21 can include data reporting the association between a state of the dialog system when the utterances were recorded and the utterances. Also, the speech recognizer hypothesis, and acoustic and semantic confidence scores, the n·m best semantic classes of the n best speech recognizer hypotheses and their respective n acoustic confidence scores and n·m semantic confidence scores can be stored.

Figure 6:
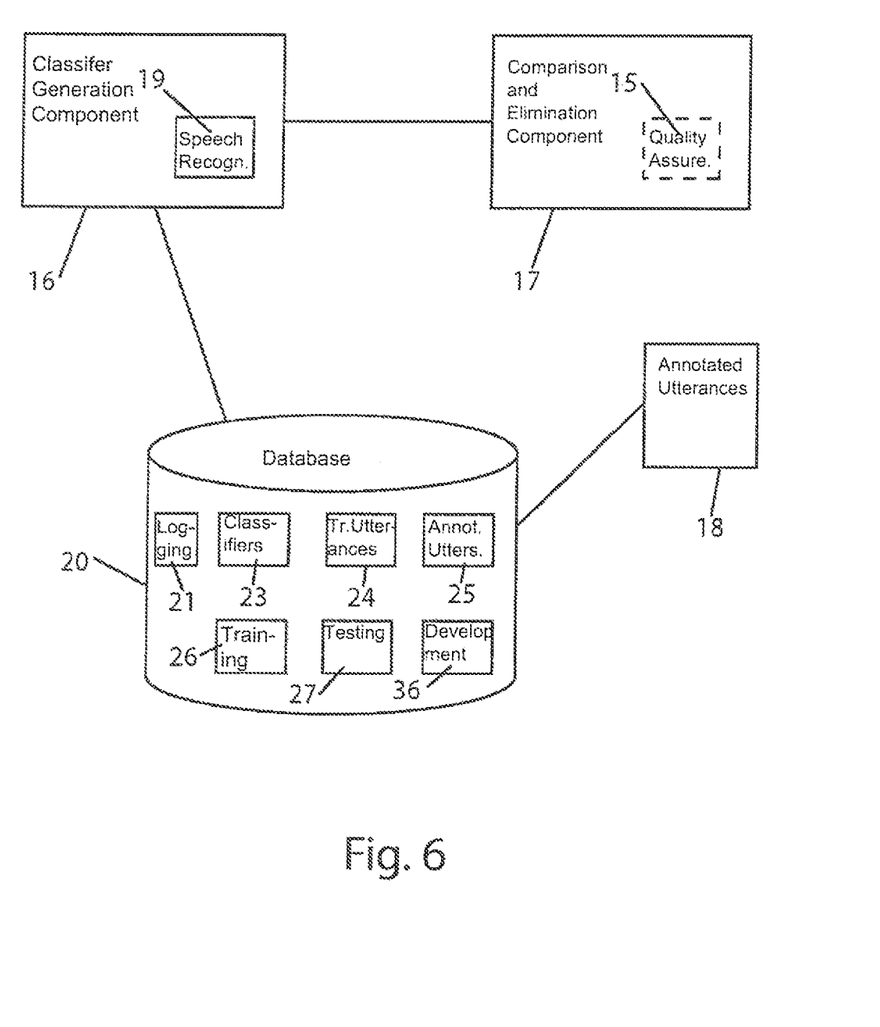
FIG. 6 shows an example of an embodiment of an optimized state-dependent classifier generation component according to an embodiment of the invention.

FIG. 6 shows an embodiment of a classifier generation component including a program to generate a state-dependent classifier 16 using data from the n or more utterances. The component 16 is operatively connected to a database 20 including logging data 21 transcription data 24 and annotation data 25. A data derivation component 18 including program for deriving data derives testing data 27 and training data 26 from the annotated utterances 25. The program 18 can also derive training data 26 and development data 36 from the training data 26. Accordingly, the component 16 is operatively connected to a data store for training data 26 and a data store for development data 36 that is derived from training data. The component 16 is also operatively connected to the logging data store 21, which includes the state-dependency data. The component also includes a test speech recognition engine 19. The training data 26 can be used to establish state-dependent classifier functionality for mapping between utterances and a class using common parameter setting (e.g., those recommended by developers, or established settings developed by a user), while the development data 36 and logging data including the state dependency data 21 is used to optimize the parameters for a classifier. Once the classifier's parameters are tuned, the test speech recognizer generates a hypothesis that can subsequently be tested in the comparison and elimination component 17 that compares the performance of the optimized state-dependent classifier against a subset of the formerly generated semantic classifiers 23.

Returning to FIG. 4, the system 1 includes a program 17 for, when executed by the processor, comparing a performance of the generated state-dependent classifiers against a subset of formerly produced semantic classifiers. This is done by comparing the generated state-dependent classifiers candidate and the subset of formerly generated semantic classifiers 23 in comparison, whereby the comparison selects the best performing of the semantic classifiers and the generated state-dependent classifiers depending on which of the classifiers outperforms the other. The worse performing classifiers can be eliminated. It will be understood that the functions of these components can be distributed or configured in any number of ways in accord with the description herein.

For example, in one embodiment, shown in FIG. 6, an elimination component 17 can optionally include a speech recognizer 15. The speech recognizer 15 is applied to the testing data 27 and produces a hypothesis to compare the performance of the optimized state-dependent classifier against the subset of semantic classifiers.

As described above, whenever a new classifier A with a performance, PA, is produced, it can be compared to the performance PB of all those classifiers B in a table whose state subset and variable combination is a subset (a) or superset (b) of the state subset and variable combination of A:
(a) if $P_A$ is significantly better than $P_B$ the classifier B can be eliminated.
(b) if $P_A$ is not significantly better than $P_B$ the classifier A can be eliminated.

The case that the state subset and variable combination of A and B are identical is a special case of both (a) and (b).

Here, a statistical measure p of the difference between PA and PB is applied to verify that the performance difference is reliable Thus after training and testing is finished, there is a set of m classifiers, along with a table containing the used state subset and variable combination and the associated performance achieved on the respective test set, as shown above in Table 2. Out of all competitors, the one that achieved highest performance in testing is selected and the worse-performing competitors are eliminated by the elimination component 17.

Again, in production, i.e., when a dialog system using state-dependent classifiers takes live calls, at every state, the rows in the table whose variables match the current state variables are selected and the semantic classifier belonging to the row with the highest performance will be used for classification in the current state.

The system and method can be adapted to be carried out in the context of a repeated optimization cycle providing more and more data and producing better and better classifiers or classifier parameters. At some point after a number of iterations of the cycles, saturation in performance might be reached, at which the algorithm would not release subsequent classifier updates because statistically significant differences in performance are not found. Nevertheless, the continuous optimization cycle can still be used as a monitoring device. Thus, when caller behavior changes over time the repeating cycle can seamlessly and correctly respond to this event. Reasons for caller behavior changes include, e.g., changes in the distribution of call reasons, system prompt changes resulting in emergence of unexpected utterances or disappearance of formerly frequently observed utterances, etc. Moreover, as state-dependent classifiers are generated and incorporated, over time further state vector variables could be identified, allowing for the continual refinement of state variable vectors that are supported by sufficient data.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A spoken dialog system, comprising:
a computer including a processor, and memory, including:
a data store for data derived from collected utterances received via the audio input;
a data store for logging data including data reporting the association between a state of the dialog system when the utterances were recorded and the utterances; and
a classifier component including a state-dependent semantic classifier generated using state-vector variables for a-the state of the dialog system, the system state being a vector of these variables including variable ranges or quantized variable values;
wherein the state-dependent semantic classifier generated by a process including;
matching the utterances to each state vector variable;
selecting subsets of the state vector variables;
determining which of the subsets of the state vector variables have at least one variable combination that corresponds with a minimum training size of n or greater utterances, wherein combinations of variables are derived at every state; and
generating the state-dependent classifier using the state subset and variable combination that correspond with the n or greater utterances, wherein more than one subset of n or greater training utterances exists for a given state subset and variable combination, and
wherein the system is configured such that at least variable ranges or quantized variable values are extracted from the system state to produce a plurality of distinct utterance subsets matching every possible system state.

2. The system of claim 1, wherein the system further comprises:
a data store for storing transcribed utterances; and
a data store for storing annotated utterances;
wherein the data derived from the collected utterances is derived from the transcribed and annotated utterances.

3. The system of claim 2 wherein the system further includes:
a data derivation component including a program for deriving testing data and training data; and
a data store for storing testing data and training data derived from the data from the n or greater utterances.

4. The system of claim 1 wherein the system further comprises:
an elimination component for determining in classifiers using the subsets of state vector variables that correspond with then or greater utterances.

5. The system of claim 4 wherein the system further comprises:
a training component for training state dependent classifiers using the subsets of state vector variables that correspond with the n or greater utterances
a comparison component for comparing the trained classifiers against initial classifiers and selecting from the compared classifiers a best-performing classifier eliminating a worse-performing classifier to determine the m classifiers.

6. The system of claim 1 wherein the determining subsets comprises:
clustering a number of the state vector variables into a discrete set.

7. The system of claim 1 wherein the process for generating the state-dependent classifier comprises:
identifying the state vector variables that are irrelevant to the dialog system's performance at the state vector.

8. The system of claim 1 wherein the state vector variables include variables selected from the group consisting essentially of variable ranges and quantized variables.

9. The system of claim 1 wherein process for generating the state-dependent classifier comprises:
selecting a classifier with a predefined number of classes;
determining a state-dependent class using the subsets of state vector variables; and
adding at least one state dependent class to the classifier.

10. A method for generating a classifier comprising:
accessing a database of data derived from collected utterances for a dialog system;
accessing logging data including data reporting the association between a state of the dialog system when the utterances were recorded and the utterances;
identifying a plurality of state vector variables for the state of the dialog system, the system state being a vector of these variables including variable ranges or quantized variable values; and
generating a state-dependent classifier using the state vector variables,
matching the utterances to each state vector variable;
selecting subsets of the state vector variables;
determining which of the subsets of the state vector variables have at least one variable combination that corresponds with minimum training size of n or greater utterances, wherein more than one subset of n or greater training utterances exists for a given state subset and variable combination, wherein combinations of variables are derived at every state; and
generating the state-dependent classifier using the subsets of state vector variables that correspond with the n or greater utterances;
wherein the system is configured such that at least variable ranges or quantized variable values are extracted from the system state to produce a plurality of distinct utterance subsets matching every possible system state.

11. The method of claim 10, wherein the method further comprises:
transcribing the utterances in a dialog system;
annotating the utterances with a semantic category;
storing data from the transcribed and annotated utterances in the database as the data derived from the collected utterances;
storing the logged data in the database.

12. The method of claim 1 wherein the method further includes:
deriving testing data and training data from the data from the n or greater utterances.

13. The method of claim 10 wherein the method comprises:
determining m classifiers using the subsets of state vector variables that correspond with the n or greater utterances.

14. The method of claim 13 wherein the method comprises:
training state-dependent classifiers using the subsets of state vector variables that correspond with the n or greater utterances; and
comparing the trained classifiers against initial classifiers and selecting from the compared classifiers a best-performing classifier eliminating a worse-performing classifier to determine the m classifiers.

15. The method of claim 10 wherein the selecting subsets comprises:
clustering a number of the state vector variables into a discrete set.

16. The method of claim 10 wherein the method comprises:
identifying the state vector variables that are irrelevant to the dialog system's performance at the state vector.

17. The method of claim 10 wherein state vector variables include variables selected from the group consisting essentially of variable ranges and quantized variables.

18. The method of claim 10 wherein process for generating the state-dependent classifier further comprises:
selecting a classifier with a predefined number of classes;
determining a state-dependent class using the subsets of state vector variables; and
adding the state dependent class to the classifier.

19. A method for generating a classifier comprising:
transcribing a plurality of utterances in a dialog system;
annotating the utterances with a semantic category;
storing data from the transcribed and annotated utterances in a database;
logging data including data reporting the association between a state of the dialog system when the utterances were recorded and the utterances;
storing the logged data in a database;
identifying a plurality of state vector variables for the state of the dialog system, the system state being a vector of these variables including variable ranges or quantized variable values;
matching the utterances to each state vector variable;
selecting subsets of the state vector variables;
determining the subsets of the state vector variables having at least one variable combination that corresponds with minimum training size of n or greater utterances, wherein combinations of variables are derived at every state; and
generating a state-dependent classifier using the subsets of state vector variables that correspond with the n or greater utterances,
wherein the system is configured such that at least variable ranges or quantized variable values are extracted from the system state to produce a plurality of distinct utterance subsets matching every possible system state.

* * * * *

UNITED STATES PATENT AND TRADEMARK OFFICE
CERTIFICATE OF CORRECTION

PATENT NO. : 8,682,669 B2
APPLICATION NO. : 12/545718
DATED : March 25, 2014
INVENTOR(S) : David Suendermann et al.

Page 1 of 1

It is certified that error appears in the above-identified patent and that said Letters Patent is hereby corrected as shown below:

In the Claims

Column 16, claim 4, line 38, change "in" to --m--;

Column 16, claim 4, line 40, change "then" to --the n--.

Signed and Sealed this
Third Day of June, 2014

Michelle K. Lee
*Deputy Director of the United States Patent and Trademark Office*